(No Model.) 3 Sheets—Sheet 1.
T. A. B. PUTNAM.
ELECTRIC RAILWAY SIGNAL.
No. 479,333. Patented July 19, 1892.
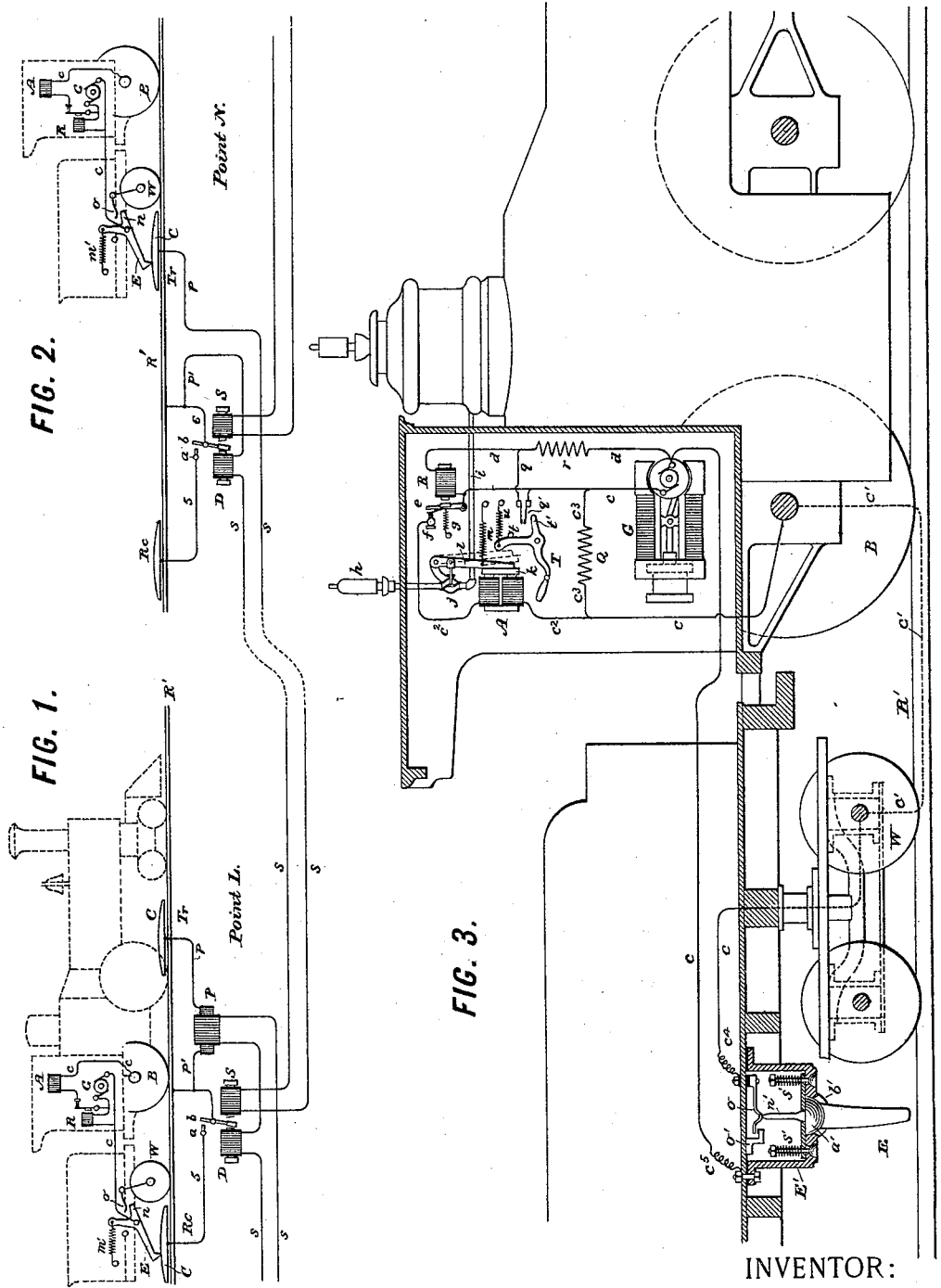
WITNESSES:
Geo. W. Breck.
Fred White
INVENTOR:
Theodore A. B. Putnam,
By his Attorneys,
Arthur E. Fraser & Co.

(No Model.) 3 Sheets—Sheet 2.
T. A. B. PUTNAM.
ELECTRIC RAILWAY SIGNAL.

No. 479,333. Patented July 19, 1892.

WITNESSES:
Geo. W. Breck.
Fred White.

INVENTOR:
Theodore A. B. Putnam,
By his Attorneys,
Arthur C. Fraser & Co.

THE NORRIS PETERS CO., PHOTO-LITHO., WASHINGTON, D. C.

(No Model.) 3 Sheets—Sheet 3.

T. A. B. PUTNAM.
ELECTRIC RAILWAY SIGNAL.

No. 479,333. Patented July 19, 1892.

WITNESSES:
Geo. W. Breck
Fred White

INVENTOR:
Theodore A. B. Putnam,
By his Attorneys,
Arthur C. Fraser & Co.

THE NORRIS PETERS CO., PHOTO-LITHO., WASHINGTON, D. C.

UNITED STATES PATENT OFFICE.

THEODORE A. B. PUTNAM, OF NEW YORK, N. Y., ASSIGNOR TO ELLA SARAH WEBSTER, OF SAME PLACE.

ELECTRIC RAILWAY-SIGNAL.

SPECIFICATION forming part of Letters Patent No. 479,333, dated July 19, 1892.

Application filed April 15, 1889. Serial No. 307,240. (No model.)

*To all whom it may concern:*

Be it known that I, THEODORE A. B. PUTNAM, a citizen of the United States, residing in the city of New York, in the county and State of New York, have invented certain new and useful Improvements in Electric Railway-Signals, of which the following is a specification.

This invention relates to electric railway-signals of that class in which a partial electric circuit is carried on the locomotive and co-operates with other partial circuits arranged along the track, in order, when a locomotive reaches a signal-receiving point, to give a signal or alarm upon the locomotive and when it reaches a signal-transmitting point to send an electric current over a partial circuit along the track to a distant signal-receiving point.

This invention is more immediately an improvement or modification of the system of signaling most fully disclosed in my patent, No. 399,556, dated March 12, 1889, to which reference may be made, although the complete system will be described herein without reference to said patent.

My present invention comprehends means for the avoidance of the insulation of the track-rails from one another, novel constructions of locomotive-contacts and of track-contacts, means for restoring the signaling devices on the locomotive, and an arrangement of circuits on the locomotive for insuring the proper transmission of signals under all circumstances.

I will proceed to explain my invention in detail with reference to the accompanying drawings, wherein it is illustrated as applied in different ways.

Figure 4:
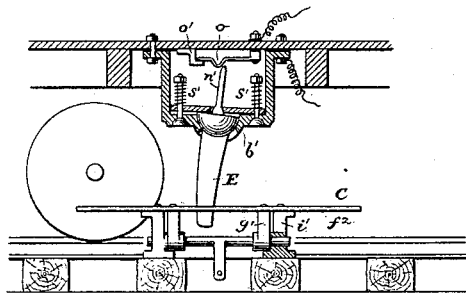
Figure 5:
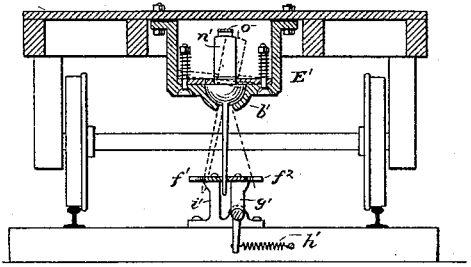
Figure 6:
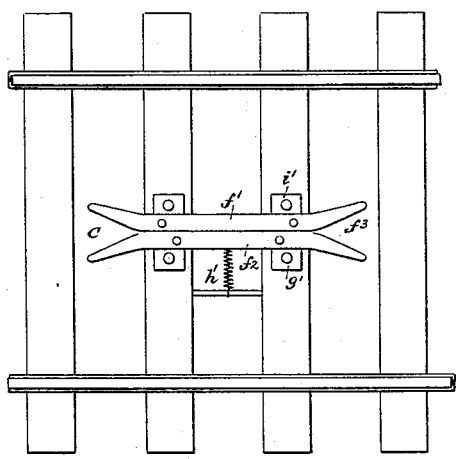
Figures 7, 8:
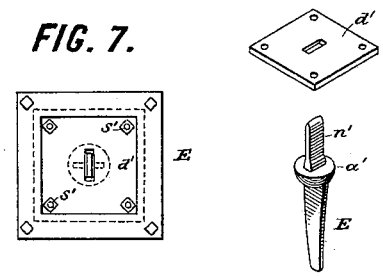
Figure 9:
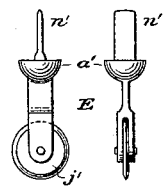
Figure 10:
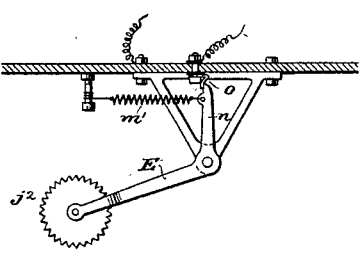
Figure 11:
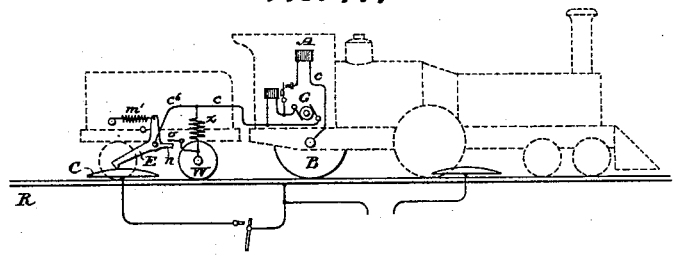
Figure 12:
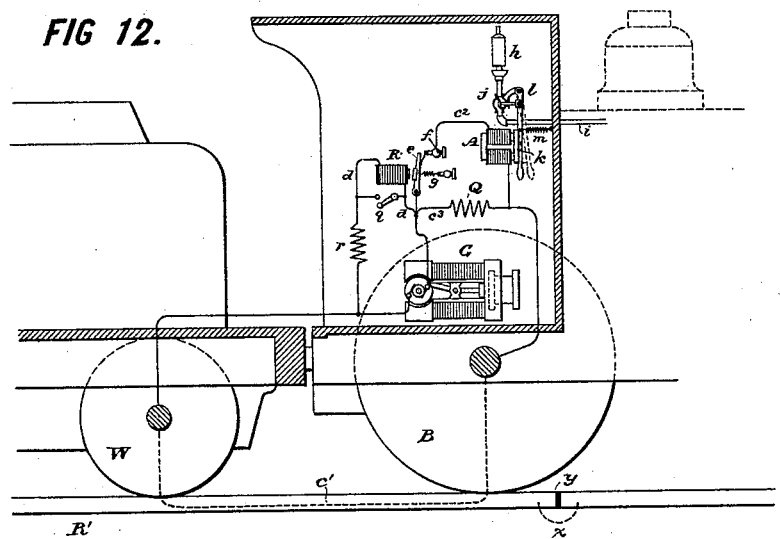

Figures 1 and 2 are diagrammatic views showing sections of railway-track and locomotives thereon, with the respective partial circuits upon the locomotives and along the track, the locomotives in these two figures being shown at signaling-points which are in electric communication with each other, one or more signaling-points being supposed to intervene. Fig. 3 is an elevation of a portion of a locomotive and tender, showing the circuits and apparatus required by my invention in its preferred form in so far as the same are located upon the locomotive or tender, but without showing the track-circuits. Figs. 4 and 5 are respectively fragmentary longitudinal and transverse sections of the tender through the contact-box thereon and illustrating, also, the contact device on the track. Fig. 6 is a plan of a fragment of the track, showing the contact device thereon. Fig. 7 is a plan of the locomotive contact-box. Fig. 8 is a perspective view of two different parts employed in this box. Fig. 9 includes two elevations showing a modified construction of the contact-making arm or lever of this box. Fig. 10 is a fragmentary longitudinal section of the tender, showing a modified construction of the form of contact-lever shown in Figs. 1 and 2. Fig. 11 is a diagrammatic view answering to Fig. 1 and showing a modified construction. Fig. 12 is a fragmentary section of a locomotive, showing a modification of the circuits thereon.

I will describe first the arrangement of the circuits and their accessories upon the locomotive, referring for that purpose principally to Figs. 1, 2, and 3.

The locomotive-engine carries a dynamo G, (or a galvanic battery or other generator of electricity,) one terminal of which is connected electrically with one or more of the wheels B of the locomotive, and the other terminal is connected with one or more of the wheels W thereof, being preferably those of the tender, thus constituting a partial circuit *c c*. The wheels B and W, which are insulated from each other, thus constitute the terminals of this partial circuit, the circuit being normally closed and completed through the wheels and the rail R′, as shown by the dotted lines *c′* in Fig. 3. In this partial circuit *c c* is included an electro-magnet A, which operates the danger alarm or signal in the cab.

The danger-signal shown consists of a whistle *h*, supplied with steam by a pipe *i*, leading from the boiler and controlled by a valve *j*, which is normally held closed by the armature *k*, which is attracted by the magnet A and which is mounted on a lever *l*, connected to the valve. Either a retracting-spring *m* or the steam-pressure on the valve *j*, or both, tends to draw the armature *k* away from the magnet A; but so long as the circuit *c c′* remains closed, so that an electric current flows through the magnet A, the latter continues to attract its armature and the signal is restrained from sounding.

A relay-magnet R is arranged in a shunt-circuit $d\,d$ of high resistance, extending from one terminal of the dynamo G to the other. For example, if the resistance of the circuit $c\,c'$, including the magnet A, is two ohms, the resistance of the shunt-circuit $d\,d$, including the relay R, may be approximately ten ohms. This resistance is preferably attained by introducing a rheostat $r$. Normally the current traversing the relay R is insufficient to attract its armature-lever $e$ against the tension of its retracting spring $g$, so that the lever $e$ remains in contact with the stop-screw $f$ and the circuit $c^2$ to the magnet A remains closed.

According to one construction or system of signals, (shown in Fig. 12) the railway-track is provided at intervals with an insulation $y$ between two successive track-rails. When the locomotive-engine runs over this insulation so that for a moment the wheels B W are on opposite sides thereof, the circuit $c\,c$ cannot be completed through the rails, but will normally be broken by the insulation $y$. The cessation of current in the magnet A releases its armature $k$, the valve $j$ is opened, and steam enters the whistle $h$, whereby the alarm is given to the engine-driver. It sometimes occurs, however, especially in wet weather, that the insulation at $y$ is imperfect, so that, instead of the circuit being broken, there is a leakage around the insulation, as indicated by the dotted line $x$, which has the effect of introducing a resistance into the partial circuit $c\,c$, which varies according to circumstances. In practice it will usually exceed ten ohms. In such case the resistance of the circuit $c\,c$ is increased, while that of the shunt $d\,d$ remains the same, so that the current flowing through the shunt increases sufficiently to attract the armature-lever $e$ and break contact with the screw $f$, whereby the partial circuit $c\,c\,c^2$ is positively broken and the alarm-magnet A is forced to release its armature $k$ and give the alarm. Inasmuch, however, as the insulation of the rails at the signaling-points is sometimes objectionable—for example, in the case of elevated railways or rapid-transit railways, where the signaling-points are very close together—I have devised a means for avoiding the necessity of this insulation, and which I apply, preferably, in the manner shown in Figs. 3 to 8; but as this system can be best understood from the simple construction shown in Figs. 1 and 2 I will describe it and the track-circuits by the use of these figures.

At each signal receiving and transmitting position I apply a conducting rail or plate C on or along the track, insulated from the track-rails R' and arranged, preferably, between the two rails. The locomotive or its tender carries a lever E, the end of which rubs over the contact-rails C C in passing. The rails C C are placed at such height as to lift the lever against the pressure of a spring $m'$, thereby moving its end $n$ out of contact with a spring or stop $o$. The lever-arm $n$ and contact-spring $o$ are included in the circuit $c$, leading from the generator G to the wheel W, (or to the wheel B, if preferred.) Normally the current flows from the generator G through the circuit $c\,c$, through contacts $n\,o$ to wheel W, thence through the rail R' to wheel B, and thence back to the generator. When, however, the lever E is passing over one of the contact-rails C, this circuit is broken at $n\,o$ and the current may flow through lever E to plate C, and thence to the track-circuit, which terminates in that plate. The arm $n$ and spring $o$ (or any equivalent parts) thus constitute a circuit-manipulator or circuit-breaker operated by the contact-lever E.

The arrangement of the partial track-circuits is the same as in my last-mentioned patent, except that, instead of the terminals of the partial circuits being connected to successive track-rails insulated from each other, they are connected to the plates C C and the track-rails, respectively.

The railway is divided into blocks or sections by means of signal-points arranged at any suitable distance apart—say, for example, every mile. At each signal-point there are arranged two of the insulated plates or rails C C, so that when a locomotive is passing its contact-lever E will touch first one and then the other of these plates. The plate first touched is in the position marked R $c$, and when the locomotive reaches such position that this lever E touches this plate it is at the signal-receiving point. The other plate is placed at T $r$, and when the contact-lever touches this the locomotive is at the signal-transmitting point. The plate R $c$ is connected by a partial circuit 5 6 with the track-rails R', so that a current may flow from the lever E through the plate C, wires 5 and 6, rail R', and wheel B, thereby completing the partial circuit $c\,c$ on the locomotive, so that the signal shall not be given. The partial circuit 5 6, however, is provided with a circuit-breaker $a\,b$, by which in case of danger it is broken, so that it cannot serve to complete the circuit $c\,c$, and the latter being broken at $n\,o$ and at $a\,b$ the alarm is given. The circuit-breaker $a\,b$ is operated by two oppositely-arranged magnets D and S, the former being the danger-magnet, which when excited breaks the circuit or sets the signaling-point to "danger," while the latter is the safety-magnet, which, when excited, closes the circuit, thereby setting the signaling-point to "safety."

The contact-plate C at the position T $r$ is connected by a wire $p$ with one terminal of a partial circuit, the other terminal of which connects by a wire $p'$ with the track-rail R'. This partial circuit includes the magnet D at the signaling point just passed and the magnet S at the signaling-point in the rear, preferably the second-point in the rear. For example, the partial circuit $s\ s$, terminating at C and R', respectively, at the point N, Fig. 2, includes the magnet D at that point and extends back past the point M (not shown) to the point L, Fig. 1, where it includes the magnet S. The circuit $p\ s\ s\ p'$ may be thus a simple circuit of one continuous conductor, or it may be subdivided into two circuits connected through the medium of an induction-coil P, as shown in Fig. 1, in which case the wires $p\ p'$ connect with the opposite terminals of the primary of this coil, while the secondary thereof is connected in the circuit $s\ s$. The reasons for using an induction-coil are fully set forth in my said patent. When the locomotive reaches the transmitting position the current passes from its contact-lever E to the plate C, thence through the wires $p\ p'$ to the rail R', and thence through the rail to the wheel B, thus completing the circuit. The current thus sent through the partial track-circuit either passes through the circuit $s\ s$ and excites the magnets D and S therein, or if an induction-coil is used it induces currents which flow through this circuit $s\ s$ and excites these magnets. In either case the circuit-breaker $a\ b$ at the point which is passed over is set to "danger" and that at the second point in the rear is set to "safety."

I claim no novelty in this arrangement of partially-closed circuits except in the one feature of connecting them at one terminal to one of the track-rails and at the other terminal to a distinct contact plate or rail in lieu of insulating successive track-rails from one another and connecting both the terminals to two of such insulated rails. With my new system the same circuit arrangements and connections are applicable as with my former system, and which are fully described and shown in several of my previous patents, but which I have not thought it necessary to illustrate here, since such several applications are not necessary to an understanding of the novel features of this invention.

A full understanding of the possible practical applications of this system of signaling in connection with switches, draw-bridges, single-track roads, automatic railway gates and signals may be had by referring to my previous patents, and especially to the following: No. 243,619, dated June 28, 1881; No. 258,601, dated May 30, 1882; No. 284,670, dated September 11, 1883, and No. 289,137, dated November 28, 1883.

Figs. 3 to 8 show the preferred construction of contact-lever E on the locomotive and contact-plate C on the track, which I will now describe: The lever E consists of a vertical plate or blade fixed to and projecting downwardly from a half ball or sphere $a'$, which works in a half-spherical socket $b'$, formed at the bottom of a square box E'. A square plate $d'$, Fig. 8, fits over the half-ball and is pressed down by four springs $s'\ s'$, preferably spiral springs, mounted on bolts passing through the corners of the plate and the corners of the box, as clearly shown. A contact-arm $n'$ projects upwardly from the ball $a'$, and when the lever E is in the normal position, as shown in Fig. 3, this arm makes contact with a contact-spring $o$, (the same as the spring $o$ in Figs. 1 and 2,) which is connected by a wire $c^4$ with the wheels W of the tender or with the conducting-framework thereof, as shown in Fig. 3. When the lever E is tilted, as shown in Fig. 4, this arm $n'$ breaks contact with the spring $o$, the latter being prevented from springing downwardly by a stop $o'$. The box E' is connected by a wire $c^5$ with the generator G, the wires $c^4$ and $c^5$ constituting a part of the partial circuit $c\ c$. The construction of the ball-and-socket joint is such that the lever or blade E may be tilted either forward or back to break contact between $n'$ and $o$ or laterally, as indicated by the dotted lines in Fig. 5, and without necessarily breaking contact.

The contact rails or plates C C on the track consist each of a fixed plate $f'$ and a movable plate $f^2$, (shown in plan in Fig. 6,) the latter being mounted on a lever $g'$ and pressed against the plate $f'$ by a spring $h'$, as shown in the transverse section, Fig. 5. The fixed plate $f'$ is rigidly supported on frames $i'$, in which the lever $g'$ is pivoted. These frames $i'$ are bolted to the wooden cross-ties or sleepers, by which means the complete structure C is insulated from the track-rails. The lever-blade E enters the flared ends $f^3$ of the plates $f'\ f^2$ and presses the plates slightly apart, sliding through between them, whereby it makes a good electrical contact with them. The friction of the plates against the lever drags the latter backward, thereby deflecting its contact-arm $e'$ and forcing it out of contact with the spring $o$, as shown in Fig. 4. This deflection may be in either backward or forward direction, according as the locomotive may be running forward or backward. The springs $s'\ s'$, acting on the ball $a'$ through the plate $d'$, resist any deflection of the lever E and instantly restore it to its normal position when it has passed beyond the plates C. The lever E is permitted to swing laterally, as indicated by the dotted lines in Fig. 5, in order that it may adapt itself to the position of the plates $f\ f^2$ in entering between them. This construction of the track-plates insures against their being obstructed by snow or ice to such extent as to prevent making a good electrical contact with the lever E in its passage. The lever E may be otherwise hung, so as to be capable of universal motion both forward and back and in lateral direction; but the ball-and-socket connection shown is considered the most simple and effective.

Fig. 9 shows a modification of the lever E, which, instead of being made as a flat plate, is provided with a wheel $j'$, having a beveled edge adapted to enter between the plates $f'\ f^2$ of the track-contact device C. In case the arrangement of the contact-lever shown in Figs. 1 and 2 is preferred, I prefer to provide the lever E with a serrated wheel $j^2$, as shown in Fig. 10, which by rolling over the contact-plates C C will break up any ice that may have formed upon them, its teeth cutting through the ice or any dirt or deposit on the rail and insuring a good electrical contact therewith. The upper arm of the lever makes contact with a stud or stop $o$, which is preferably a spring-contact.

My invention introduces some additional features relative to the circuits and accessories on the locomotive which remain to be described. When a signal is given, the whistle $h$ will continue to sound until the engineer restores the signal devices to their normal condition. This he does by pulling down the lever T, which, normally, is drawn by a stiff spring $u$ against a stop $t$, as shown. When the armature $k$ is retracted from the magnet A, it is stopped by the upper arm of this lever T, as shown by dotted lines. The pulling down of the lever T presses the armature back against the poles of the magnet A, and then by the contact of the lever-arm $t'$ with a contact-spring $q'$ presses the latter against another contact-spring, and thereby closes a short circuit or bridge $q$ between the two conductors of the shunt $d$, thereby short-circuiting the coils of the relay R and permitting the retracting-spring of this relay to pull off its armature and re-establish contact between $e$ and $f$, whereupon the current will again flow through the magnet A, which will then attract and hold its armature. In Fig. 12 a separate manually-operated switch $q$ is shown for thus short-circuiting the relay R. Upon receiving a danger-signal the circuit $c$ $c$ is broken, and if before the circuit is re-established the locomotive should reach the transmitting position it would be unable to transmit any current over the partial track-circuit to set the preceding points to "safety." To avoid this disadvantage, I provide a shunt or short circuit $c^3$, bridging across the circuit $c$ $c$ and short-circuiting the portion $c^2$ thereof, which includes the alarm-magnet A and relay-contacts $e f$. In this shunt $c^3$ I introduce a resistance Q, sufficient to normally deflect enough current through the magnet A to maintain its excitation. If the rheostat has a resistance of four ohms, the magnet A of four ohms, and the shunt $d$ $d$, with its rheostat $r$ and relay R, of ten ohms, then, normally, the current will divide in the proportion of two-twelfths through the relay R, five-twelfths through the alarm-magnet A, and five-twelfths through the rheostat Q. On reaching the receiving position and receiving a danger-signal with a leakage of ten ohms between the contact-plate C and rail R' the current will divide in the proportion of twelve twenty-seconds through the relay R, five twenty-seconds through the magnet A, and five twenty-seconds through the rheostat Q, thus increasing the current through R more than three times and causing it to act and cut out the magnet A. The current will then flow four-fourteenths through the relay R and ten-fourteenths through the rheostat Q. If now the transmitting position is reached and the partial track-circuit has a resistance of, say, four ohms, ten-eighteenths of the current will still flow through the circuit $c$ $c$ and shunt $c^3$ and through the partial track-circuit, which will be sufficient to operate the electro-magnets D and S of the partial circuit.

The danger-signal on the locomotive-engine may be any other known kind of signal or annunciator instead of the whistle $h$, or any other means known in the art may be provided for attracting the attention of the engine-driver.

The rear terminal W of the partial circuit $c$ $c$ might be any other wheels of the train instead of the wheels of the tender, or be otherwise modified in any way known to the art.

Fig. 11 shows a modification of the circuit arrangements shown in Figs. 1, 2, and 3, whereby the absolute breaking of the circuit $c$ $c$ is avoided. The circuit $c$ $c$ is short circuited or bridged across the circuit-breaking contacts $n$ $o$ by a shunt containing a resistance $x$ of, for example, ten ohms. When the lever E is lifted by riding over a plate C, the separation of the contacts $n$ $o$ does not absolutely break the circuit, but introduces this resistance into the circuit. The current then divides between this resistance and the partial track-circuit in the inverse proportion of their resistances, the resistance of $x$ being necessarily sufficient to divert enough current over the track-circuits to operate the signals. The circuit arrangements may be otherwise modified in analogous manner. It is obvious that the signaling devices and partial circuits may be applied to any car of a train in lieu of the locomotive.

I claim as my invention the following-defined novel features and combinations, substantially as hereinbefore specified, namely:

1. The combination, with a locomotive, of a partial electric circuit thereon, a current-generator in said circuit, and two conducting-terminals for said circuit in contact with the rail, whereby normally said circuit is closed through the rail between said terminals, and a mechanical circuit-manipulator carried by the locomotive and adapted when displaced by contact with some provision on the track to break or vary the resistance of said circuit.

2. The combination, with a locomotive, of a partial electric circuit thereon, a current-generator in said circuit, and two conducting-terminals for said circuit in contact with the rail, whereby normally said circuit is closed through the rail between said terminals, and a circuit-breaking lever carried by the locomotive and adapted when displaced by contact with some provision on the track to break or increase the resistance of said circuit.

3. The combination, with a locomotive, of a normally-closed electric circuit thereon, a current-generator carried by the locomotive, feeding said circuit, a circuit connection between one terminal of said generator and the rail, and a contact-lever carried by the locomotive, adapted to make electrical contact with some provision along the track and in electrical connection with the other terminal of said generator.

4. A locomotive, a partial circuit thereon terminating in connections with one of the track-rails and normally closed therethrough, a current-generator upon the locomotive, feeding said circuit, and a contact device carried thereby and in electrical connection with said circuit, in combination with a track having a practically continuous or uninsulated track rail or rails with a contact plate or rail along the track, insulated from the track-rails and arranged to be touched by said contact device in its passage, and a partial track-circuit with one terminal connected to said contact-plate and the other to one of said continuous track-rails.

5. The combination of a railway-track having a contact plate or rail insulated from the track-rails and a partial circuit with one terminal connected to said plate and the other to one of the track-rails, with a locomotive, a partial circuit thereon terminating in connections with the rail, whereby it is normally closed through the rail, a current-generator on the locomotive, feeding said partial circuit, and a contact lever or device carried by the locomotive, connected with said partial circuit and arranged to make contact with said contact-plate in passing it, and thereby to connect the partial track-circuit momentarily to said partial locomotive-circuit.

6. The combination of a railway-track having a contact plate or rail insulated from the track-rails and a partial circuit with one terminal connected to said plate and the other to one of the track-rails, with a locomotive, a partial circuit thereon terminating in connections with the rail, whereby it is normally closed through the rail, a current-generator on the locomotive, feeding said partial circuit, a contact lever or device carried by the locomotive, connected with said partial circuit and arranged to make contact with said contact-plate in passing it, and thereby to connect the partial track-circuit momentarily to said partial locomotive-circuit, and a circuit-breaker operated by the contact of said lever with the contact-plate and adapted to break the partial locomotive-circuit between the connection of said contact-lever and the rail connections, whereby a greater proportion of the current from said generator is diverted through said partial track-circuit.

7. The combination of a railway-track having a contact plate or rail insulated from the track-rails and a partial circuit with one terminal connected to said plate and the other to one of the track-rails, with a locomotive, a partial circuit thereon terminating in connections with the rail, whereby it is normally closed through the rail, a current-generator on the locomotive feeding said partial circuit, a contact lever or device carried by the locomotive, connected with said partial circuit and arranged to make contact with said contact-plate in passing it, and thereby to connect the partial track-circuit momentarily to said partial locomotive-circuit, and an alarm-magnet in operative connection with said partial locomotive-circuit and adapted to give an alarm upon a certain change in the volume of current from the normal.

8. The combination of a railway-track having a contact plate or rail insulated from the track-rails and a partial circuit terminating at said plate and one of the track-rails, with a locomotive, a current-generator and contact-lever carried thereby, said lever arranged to make contact with and be displaced by said contact-plate in passing it, a partial circuit on the locomotive terminating in connections with the rail, whereby it is normally closed through the rail, and a circuit-breaker in said partial locomotive-circuit operated to break it or increase its resistance by the displacement of said contact-lever.

9. The combination, with a railway-track, a contact plate or rail consisting of plates or bars laid longitudinally side by side, spread apart or flared laterally at their ends, and movable relatively toward or from each other, and a spring for pressing said plates together, of a locomotive carrying a contact-lever adapted to enter between said plates in passing, a partial circuit connected to said lever, and a current-generator on the locomotive feeding said partial circuit.

10. The combination, with a railway-track, of a plate $f'$, mounted on the ties, a plate $f^2$, arranged against said plate and movable toward and from it, a lever $g'$, on which said plate $f^2$ is fixed, and a spring $h'$, arranged to exert its tension against said lever to press the two plates together.

11. The combination, with a locomotive, of a circuit-breaking lever carried thereby, a ball-and-socket connection between said lever and its bearing, springs for holding said lever in its normal position, a contact-arm on said lever, and a contact-spring arranged to be touched by said arm in the normal position of the lever and to break contact therewith on the deflection of the lever.

12. The combination, with a locomotive, of a circuit-breaking lever carried thereby, a half-ball formed on said lever, a hemispherical socket in which said ball is held, a movable plate lying against the flat side of said ball, and springs pressing against said plate to return the plate to its normal position when displaced.

13. The combination, with a locomotive, of a box or casing $U'$, having a hemispherical socket $b'$, a contact-lever E, having a half-ball $a'$ movable in said socket, a plate $d'$, lying against the flat side of said ball, and springs $s'\ s'$, pressing said plate against said ball, whereby the lever E may be deflected in any direction and will be restored to its normal position by the tension of said springs.

14. The combination, with a locomotive, of a partial electric circuit thereon terminating in connections with the rail and normally closed therethrough, a current-generator in said circuit, an electro-magnet and circuit-breaking contacts in said circuit, a relay-magnet for operating said contacts, and a short circuit cutting out said alarm-magnet and contacts, but not said rail connection, and including a resistance, whereby the absolute breaking of the partial circuit through the rail connections by the separation of the relay-contacts is prevented.

15. The combination, with a locomotive, of a partial circuit thereon, a current-generator and an alarm-magnet in said circuit, circuit-breaking contacts in said circuit, a relay-magnet for operating said contacts to break said circuit, and a switch for manually decreasing or discontinuing the current through said relay to cause it to release its armature and restore the current through said alarm-magnet.

16. The combination, with a locomotive, of a partial circuit thereon, a current-generator in said circuit, an alarm-magnet operating to give an alarm upon the release of its armature, a relay-magnet for governing the operation of said alarm-magnet, connected in a shunt of said partial circuit, a switch for manually varying the current through said relay to cause it to restore the normal current to the alarm-magnet, and a restoring-lever arranged when vibrated to restore its armature to said alarm-magnet and to operate said switch, whereby the alarm-magnet is caused to reattract and hold its restored armature.

17. The combination, with a locomotive, of a partial circuit thereon, a current-generator and alarm-magnet in said circuit, circuit-breaking contacts for breaking said circuit, a relay-magnet for operating said contacts, the circuit of said relay, short-circuiting contacts in said relay-circuit, adapted to cut out said relay, and a restoring-lever arranged when vibrated to restore its armature to said alarm-magnet and to close said short circuit, whereby the relay-magnet is caused to release its armature and the normal circuit through the alarm-magnet is restored.

In witness whereof I have hereunto signed my name in the presence of two subscribing witnesses.

THEODORE A. B. PUTNAM.

Witnesses:
ARTHUR C. FRASER,
JNO. E. GAVIN.